United States Patent [19]

Mandola

[11] Patent Number: 5,616,242
[45] Date of Patent: Apr. 1, 1997

[54] TWO STAGE BOTTLE FILTER FOR THE REMOVAL OF SEDIMENT

[76] Inventor: Mary D. Mandola, 8860 Cedarspur, Houston, Tex. 77055

[21] Appl. No.: 451,646

[22] Filed: May 26, 1995

[51] Int. Cl.$^6$ ............................. B01D 35/02; B65D 25/48
[52] U.S. Cl. ..................... 210/238; 210/474; 210/477; 210/485; 210/497.2; 222/189.08; 222/568; 215/308
[58] Field of Search ..................... 222/189.08, 189.06, 222/566, 567, 568; 210/473, 474, 475, 476, 477, 483, 497.01, 252, 485, 497.2; 215/308

[56] References Cited

U.S. PATENT DOCUMENTS

| | | |
|---|---|---|
| 728,426 | 4/1901 | Timar . |
| 872,407 | 12/1907 | Donahoe . |
| 920,791 | 5/1909 | Tonini . |
| 1,164,453 | 12/1915 | Belles ............................. 222/189.08 |
| 1,213,319 | 1/1917 | Whitaker . |
| 1,966,661 | 7/1934 | Cobel ................................ 259/27 |
| 2,055,096 | 9/1936 | Dehn et al. .......................... 53/3 |
| 2,207,294 | 7/1940 | Hubner et al. ...................... 221/60 |
| 3,449,081 | 6/1969 | Hughes ............................. 23/253 |
| 3,779,415 | 12/1973 | Eddleman et al. .................. 215/48 |
| 3,912,638 | 10/1975 | Beaubien ............................ 35/28 |
| 3,926,348 | 12/1975 | Lutzker . |
| 3,951,798 | 4/1976 | Haldopoulos ...................... 210/452 |
| 4,558,640 | 12/1985 | Marchant ........................... 31/12 |
| 4,642,190 | 2/1987 | Zimmerman ...................... 210/464 |
| 4,792,454 | 12/1988 | Lemonnier . |
| 5,167,819 | 12/1992 | Iana et al. . |
| 5,417,860 | 5/1995 | Kay .................................. 210/472 |

OTHER PUBLICATIONS

*International Wine Accessories 1995 Summer Sale Catalog,* p. 7, item #WF150–001; and p. 8, item #WF02–001 and WF02–202.

Primary Examiner—Robert J. Popovics
Attorney, Agent, or Firm—Fulbright & Jaworski L.L.P.

[57] ABSTRACT

The present invention is drawn to an apparatus for filtering sediment from beverages, especially port and other fine wines, comprising a cork or stopper member having a central aperture; a tube disposed through said central aperture of said cork or stopper, said tube having a first end and a second end; a first filter member disposed generally around and extending from one end of said tube, forming a junction with said tube, said first filter member being of a fine mesh for straining solids and sediment; and a second filter member interposed at or about said junction of said filter member and said tube, said second filter member being of a finer mesh than the mesh of said first filter member.

7 Claims, 2 Drawing Sheets

DIAGRAM OF SEDIMENT FILTER

HANDLE FOR SEDIMENT FILTER IS NOT ON DIAGRAM

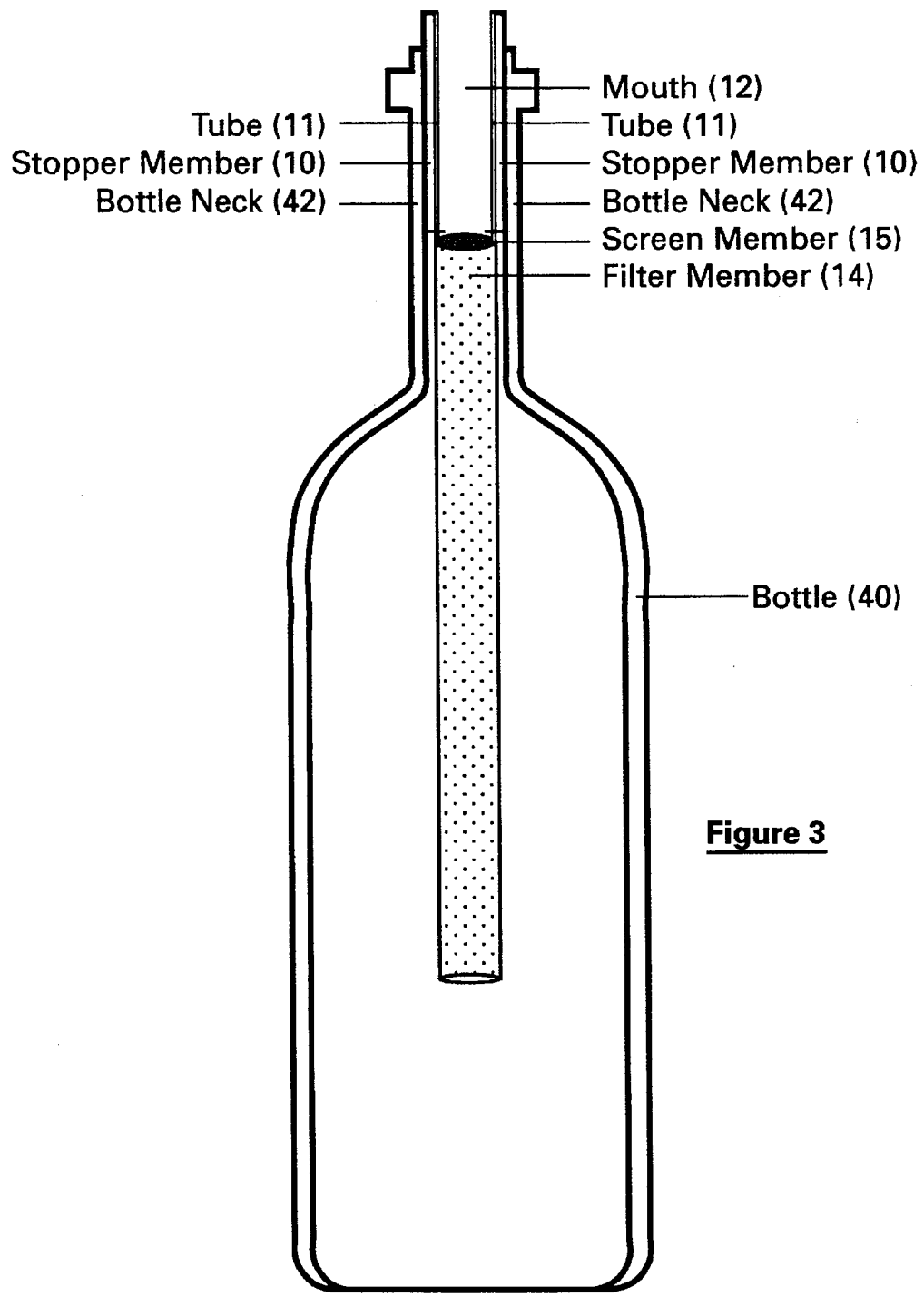

5,616,242

TWO STAGE BOTTLE FILTER FOR THE REMOVAL OF SEDIMENT

BACKGROUND OF THE INVENTION

1. Field of the Invention

The present invention relates generally to an apparatus for filtering sediment or solids from beverages. More particularly, the present invention relates generally to a novel apparatus for filtering sediment from fine wines including port wines.

2. Background of the Invention

The present invention relates to an apparatus for filtering sediment from ports and other fine wines. Ports and other fine wines often contain a great deal of sediment, and it is preferable to remove such sediment from the wine before or as it is poured into a glass for serving.

In less expensive wines, sediment is rare. However, more expensive wines and ports designated for long periods of bottle aging frequently deposit the tannins and anthocyans that result from phenolic polymerization. Tartrates and phenolics promote the wine's bouquet. Additionally, insoluble materials added to the wine to promote clarification will precipitate resulting in sediment.

Sediment is particularly problematic in vintage ports. Vintage ports are commonly bottle-aged longer than most other wines and are particularly thick, dark and hearty. Vintage ports are especially high in phenolics and throw off a heavy deposit. Similarly, as the name suggests, "crusted" or "crusting" ports throw a crust or deposit in the bottle as they are bottled young with little fermentation and are raised or aged in the bottle.

A common method of dealing with sediment in fine wines is to decant the wine before serving. This process, however, is controversial among wine aficionados, due to the effect of oxygen as it contacts the wine. As the wine is poured from the bottle to the decanter, oxygen becomes dissolved in the wine. This oxidation is detrimental to the wine as the gas diffuses the aroma of the wine, resulting in loss of important sensory impressions. Fully mature wines especially cannot long withstand oxygen exposure before succumbing to oxidation. The decanting process is to be distinguished from the process of uncorking a wine to allow it to "breathe." Breathing results in minimal oxidation.

As alternatives to decanting, various devices and methods have been used in the past to remove or filter sediment from wine. For example, one commonly used method involves filtering the wine through several layers of cheese cloth. The cheese cloth is held over the mouth of the wine bottle and the liquid is simply poured through the cloth. The cloth is then discarded. This method has distinct disadvantages. First, cheese cloth is not readily available. Second, the cloth is not reusable, leading to waste. Further, filtering wine in such a manner is cumbersome. Finally, the cloth absorbs some quantity of the wine. Vintage ports and other fine wines can be very expensive and it is preferred to not have quantities of the wine absorbed into material that is then discarded.

Another common apparatus for filtering sediment from wine is a mesh funnel. The wine is poured through the mesh funnel into the glass. A disadvantage of this apparatus and method is that the apertures or mesh of the funnel must be small enough to filter out the sediment; however, if the apertures are too small, the filter will clog quickly and must be rinsed. It is unappealing to rinse the funnel during the pouring of the wine, and the residual water left on the funnel from rinsing may alter the taste of the wine as the next portion is filtered. Additionally, mesh funnel-type devices that are available currently have removable screen filters that slip when the wine is poured through, resulting in sediment escaping into the glass.

SUMMARY OF THE INVENTION

It is an object of the present invention to provide an apparatus for filtering sediment from ports and other fine wines or any other beverage that may contain sediment.

A further object of this invention is to provide a glass of wine without sediment without risking loss of bouquet of the wine due to decanting.

An additional object of the present invention is to provide a reusable apparatus for filtering sediment from fine and port wines.

It is a particular object of this invention to provide an apparatus that will fit snugly inside the neck of a bottle so that sediment cannot escape through the apparatus.

A further object of the present invention is to provide an apparatus for filtering sediment from fine and port wines that will not absorb the wine.

It is a particular object of the present invention to provide an apparatus that will filter very fine sediment without clogging quickly.

It is an additional object of this invention to allow for quick and easy filtering of fine wines or port wines.

Similarly, it is still a further object of the present invention to provide an apparatus that will filter a quantity of wine equal to several glassfuls, without requiring an intervening rinse.

Thus, in accomplishing the foregoing objects, there is provided in accordance with the present invention an apparatus for filtering sediment from fine wines and port wines comprising a cork or stopper having a central aperture; a tube disposed through said central aperture of said cork or stopper, said tube having a first end and a second end; a first filter member disposed generally around and extending from one end of said tube, forming a junction with said tube, said first filter member being of a fine mesh for straining solids and sediment; and a second filter member interposed at or about said junction of said filter member and said tube, said second filter member being of a finer mesh than the mesh of said first filter member.

Other and further objects, features and advantages will be apparent and the invention more readily understood from a reading of the following specification and by reference to the accompanying drawings forming a part thereof, wherein the examples of the presently preferred embodiments of the invention are given for the purposes of disclosure.

DESCRIPTION OF THE DRAWINGS

FIG. 2 is a view taken along the line 2—2 of FIG. 1.

FIG. 3 is a cross-sectional view of a bottle with the filter device in place.

DETAILED DESCRIPTION OF THE INVENTION

Figure 1:
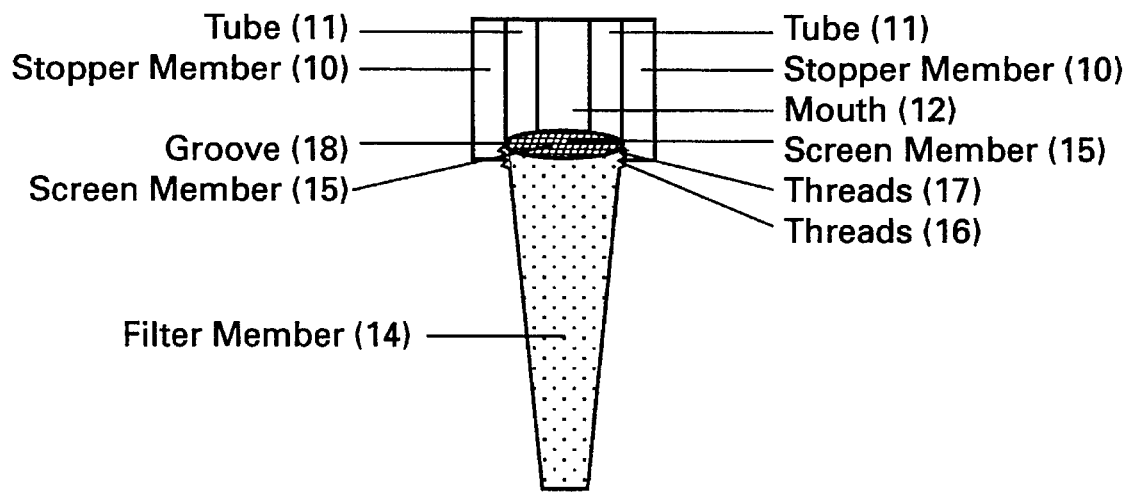
FIG. 1 is a side view, partly in cross-section, of the filter device of the present invention.

It will be apparent to one skilled in the art that various substitutions and modifications may be made to the invention disclosed herein without departing from the scope of the invention.

Referring now to FIGS. 1–3, there is shown a filter apparatus 20. FIG. 1 shows a side view of the apparatus 20. Apparatus 20 is comprised of a stopper member 10 having a central aperture, with a tube 11 disposed in said aperture. A first filter member 14 is supported from one end of the tube 11. A junction 13 is formed where said first filter member 14 joins said tube 11. A second filter member 15 is positioned at said junction 13 of the first filter member 14 and the tube 11. In a preferred embodiment, tube 11 has interior threads 16 which are engagable with exterior threads 17 of the first filter member. A mouth 12 is defined at the other end of said tube 11.

FIG. 2 shows a view taken along the line 2—2 of FIG. 1 showing apparatus 20 in place in bottle neck 42. The outermost portion is defined by the bottle neck 42. Immediately interior to the bottle neck 42 is the stopper member 10. Interior to the stopper member 10 is the tube 11 defining the mouth 12.

FIG. 3 shows a crossectional view of a bottle with an another embodiment of apparatus 20. Note that apparatus 20 exhibits a first filter member 14a that is preferably cylindrical, as opposed to frustoconical or tapered.

In one embodiment of the present invention, tube 11 has interior threads 16 at junction 13, which are engagable with exterior threads 17 of the first filter member 14. In a more preferred embodiment, the second filter member 15 fits into a groove 18 cut into the interior of tube 11, immediately adjacent to junction 13, wherein said second filter member 15 is temporally received by said groove 13 and abuts said first filter member 14.

The advantages of having two filter members in sequence is easily understood by one skilled in the art. The first, more coarse-meshed filter filters out the majority of the sediment, but has mesh of large enough size that clogging is not a problem (and the attendant rinsing is not necessary). The second filter in the sequence then filters the finer sediment that was not caught by the first, larger mesh filter. One of ordinary skill in the art will appreciate that the relative sizing of the mesh of the two filters will permit maximum filtration without requiring intermediate rinsing of either filter while pouring the wine or port wine. The mesh sizes of the filters will depend upon the size and amount of sediment to be filtered.

In another preferred embodiment, the first and second filter members are made of a non-reactive material such as metal. Such material makes the device durable and easy to clean.

In a more preferred embodiment, a handle may be attached to the device to allow for easier removal of the device from the bottle. In another preferred embodiment, a selection of first and second filter members having various mesh sizes is provided in a kit.

One skilled in the art will readily appreciate that the present invention is well adapted to carry out the objects and obtain the ends and advantages mentioned, as well as those inherent therein. The particular composition of stopper member, tube, first filter member and second filter member described herein are representative of preferred embodiments, and intended to be exemplary and are not intended as limitations of the scope of the invention. Changes therein and other uses which are encompassed within the spirit of the invention and are defined by the appended claims will occur to those skilled in the art.

I claim:

1. An apparatus to fit into a mouth of a bottle for filtering sediment from ports or fine wines, said apparatus comprising:

a stopper member having a central aperture;

a tube disposed through said central aperture of said stopper member, said tube having an interior and an exterior and a first end and a second end wherein the second end defines a mouth;

a first filter member supported at or about said first end of said tube, forming a junction with said first end of said tube, said first filter member being of a fine mesh for straining solids and sediment and said first filter member having an exterior and an interior; and a second filter member interposed at or about said junction of said first filter member and said first end of said tube such that both of said filter members are located at or about said first end of said tube, said second filter member being of a finer mesh than said mesh of said first filter member and said second filter member being in series with said first filter member.

2. The apparatus of claim 1, wherein said tube member has interior threads and said first filter member has exterior threads, wherein said interior threads of said tube are engagable with said exterior threads of said first filter member.

3. The apparatus of claim 1, wherein said second filter member fits into a groove cut into said interior of said tube immediately adjacent to said junction, wherein said second filter member fits into said groove and abuts said first filter member.

4. The apparatus of claim 1, wherein an area of said first filter member is larger than an area of said second filter member.

5. The apparatus of claim 1, wherein said apparatus is reusable and capable of being disassembled.

6. The apparatus of claim 1, wherein said first filter member and said second member are made of non-reactive metal.

7. The apparatus of claim 1, further comprising a handle.

\* \* \* \* \*